US007311880B2

(12) United States Patent
Perman et al.

(10) Patent No.: US 7,311,880 B2
(45) Date of Patent: Dec. 25, 2007

(54) WELL-LESS FILTRATION DEVICE

(75) Inventors: Craig A. Perman, Woodbury, MN (US); Jason R. Jacobson, Columbia, MO (US)

(73) Assignee: 3M Innovative Properties Company, St. Paul, MN (US)

(*) Notice: Subject to any disclaimer, the term of this patent is extended or adjusted under 35 U.S.C. 154(b) by 563 days.

(21) Appl. No.: 10/167,370

(22) Filed: Jun. 11, 2002

(65) Prior Publication Data

US 2002/0155034 A1 Oct. 24, 2002

Related U.S. Application Data

(63) Continuation of application No. PCT/US00/12468, filed on May 8, 2000, now abandoned.

(30) Foreign Application Priority Data

Dec. 23, 1999 (EP) .................................. 99204504

(51) Int. Cl.
*B32B 5/02* (2006.01)

(52) U.S. Cl. ....................................... 422/101; 422/267

(58) Field of Classification Search ................ 422/101, 422/267; 436/177, 436; 264/45.4, 45.1; 73/863.23; 210/773, 778, 323.1, 403, 295, 210/650, 653
See application file for complete search history.

(56) References Cited

U.S. PATENT DOCUMENTS 3,540,856 A 11/1970 Rochte et al.
3,540,857 A 11/1970 Martin
4,304,865 A 12/1981 O'Brien et al.
4,479,874 A 10/1984 Rosenberg et al.
4,686,136 A * 8/1987 Homonoff et al. .......... 442/247
4,699,717 A 10/1987 Riesner et al.
4,810,381 A 3/1989 Hagen et al.
4,871,824 A * 10/1989 Heilmann et al. .......... 526/304
4,948,442 A 8/1990 Manns
4,948,564 A 8/1990 Root et al.

(Continued)

FOREIGN PATENT DOCUMENTS

EP 0 098 534 B1 9/1986
EP 0 339 769 A1 11/1989
EP 0 359 249 A2 3/1990
EP 0 359 249 A3 3/1990
EP 0 505 118 A2 9/1992

(Continued)

OTHER PUBLICATIONS

Sovetov A.N. et al.: "Manufacture of filter systems from caprone cloth by ultrasonic 'separating' welding" Welding Production, vol. 29, No. 1, 1982, p. 7 XP002145387 abstract.

*Primary Examiner*—Jill Warden
*Assistant Examiner*—Natalia Levkovich
(74) *Attorney, Agent, or Firm*—Dena M. Ehrich; Scott A. Bardell

(57) ABSTRACT

The present invention provides a well-less filtration device that includes a pre-filter layer; a support layer; and at least one layer of solid phase extraction medium disposed between the pre-filter layer and the support layer. At least a portion of the pre-filter layer, support layer and solid phase extraction medium are ultrasonically welded together to form a pattern of filter cells and land areas with the land areas being disposed between the filter cells. The filter cells of the device may be arranged to conform to a standardized array format.

17 Claims, 9 Drawing Sheets

U.S. PATENT DOCUMENTS

| | | | | | |
|---|---|---|---|---|---|
| 5,108,704 | A | * | 4/1992 | Bowers et al. | 422/70 |
| 5,264,184 | A | | 11/1993 | Aysta et al. | |
| 5,368,729 | A | * | 11/1994 | Stefkovich et al. | 210/266 |
| RE35,062 | E | * | 10/1995 | Brostrom et al. | 128/206.12 |
| 5,464,541 | A | | 11/1995 | Aysta et al. | |
| 5,620,663 | A | | 4/1997 | Aysta et al. | |
| 5,770,860 | A | | 6/1998 | Franzen | |
| 5,885,409 | A | | 3/1999 | Gil | |
| 5,961,926 | A | * | 10/1999 | Kolb et al. | 422/101 |
| 6,159,368 | A | * | 12/2000 | Moring et al. | 210/321.75 |
| 6,319,670 | B1 | * | 11/2001 | Sigal et al. | 435/6 |
| 6,326,189 | B1 | | 12/2001 | Fukuzono et al. | 435/287.2 |

FOREIGN PATENT DOCUMENTS

| | | | | |
|---|---|---|---|---|
| EP | 0 645 187 | A2 | | 3/1995 |
| WO | WO 95/22406 | | | 8/1995 |
| WO | WO 97/41955 | | | 11/1997 |
| WO | WO 98/55233 | A1 | | 12/1998 |
| WO | 00/15331 | | * | 3/2000 |
| WO | WO 01/51206 | A1 | | 7/2001 |

* cited by examiner

WELL-LESS FILTRATION DEVICE

This application is a continuation International Patent Application No. PCT/US00/12468, with an international filing date of May 8, 2000, published in English under PCT Article 21(2) and now abandoned, which claims the priority of European Patent Application No. 99204504.7, filed Dec. 23, 1999.

BACKGROUND OF THE INVENTION

Multi-well test plates, also called micro-titer plates or micro-titer test plates, are well-known and frequently used for assays involving biological or biochemical materials. Micro-titer test plates have been described in numerous patents including U.S. Pat. Nos. 4,948,442; 3,540,856; 3,540,857; 3,540,858; 4,304,865; 4,948,564; 5,620,663; 5,464,541; 5,264,184; WO 97/41955; WO 95/22406, EP Patent Nos. 645 187 and 98 534.

Selected wells in the micro-titer test plate can be used to incubate respective microcultures or to separate biological or biochemical material followed by further processing to harvest the material. Each well has filtration means so that, upon application of a vacuum to one side of the plate, fluid in each well is expressed through the filter leaving solids, such as bacteria and the like, entrapped in the well. The filtration means can also act as a membrane such that certain materials in the test specimen are selectively bonded or otherwise retained in the filter means. The retained material may thereafter be harvested by means of a further solvent. The liquid expressed from the individual wells through the filter means may be collected in a common collecting vessel in case the liquid is not needed for further processing or alternatively, the liquid from the individual wells may be collected in individual collecting containers as disclosed in U.S. Pat. No. 5,464,541 and EP Patent No. 98 534.

Up until recently, micro-titer plates have been used that conform to a standardized size of about 85.47 by 127.76 mm having 12 rows of 8 wells each. Many expensive automation equipment has been designed to this standard. However, there is now a desire to increase the productivity of such automatic sampling. Such should preferably be accomplished in the most cost effective way and it has been proposed to retain approximately the size of the micro-titer plates yet increasing the number of wells therein. This would require minimal changes in the automation equipment.

Various methods are known to produce a micro-titer plate. These methods are typically designed to produce the standard micro-titer plates having 96 wells. For example, such plates may be manufactured as multi-layer structures including a single sheet of filter material disposed to cover the bottom apertures of all the wells, the filtration material being bonded to the periphery of one or more of the well apertures. Such a structure may suffer from a problem called "cross-talk" by which fluid from adjacent wells mingles through for example capillary action, gravity or application of pressure.

As disclosed in U.S. Pat. No. 4,304,865, a micro-titer, multi-layer plate includes a substantially rigid culture tray provided with wells having upstanding edges or rims bounding the wider openings to the wells, and incubation is achieved while the culture tray is held "upside-down", i.e. the rims are disposed below the sheet. To harvest material from such wells, a sheet of filter paper is placed over the top of a substantially rigid harvester tray having a like plurality of wells, each disposed and dimensioned to provide a tight push-fit with respect to the periphery of the rim of a corresponding well in the culture tray. The latter is then pressed against the harvester tray to push the rims into the wells in the latter, thereby die-cutting filter discs from the filter tray. Such die-cutting may also be carried out by pressing an unused culture tray against the harvester tray. The harvester tray with the filter discs may then be pressed against the culture tray bearing the incubated material. A vacuum applied to the bottom surface of the harvester tray draws fluid from the culture tray wells through the respective filter discs. This technique of cutting the filter sheet while it overlays the wells has the disadvantage that dust formed during the cutting operation gets entrapped between the walls of the well and the filter medium that may cause poor separation performance. Such micro-titer plates are also taught to be prone to "cross talk" according to U.S. Pat. No. 4,948,442.

Accordingly, the latter U.S. patent proposes a method of manufacturing in which the wells of a culture tray and harvester tray are welded together with there between a filter sheet which extends across the openings of the wells. However, this method still does not completely solve the problem of cross talk. In particular, welding of the wells may not be sufficient to avoid capillary action to cause mingling of fluids from adjacent wells. Moreover, this problem will be even more enhanced with micro-titer plates that have a high number of wells per unit area.

It could also be contemplated to produce the micro-titer plate by providing an array of integrally connected wells having opposite inlet and outlet openings, separately die cutting filter means conforming to the opening of the wells from a filter sheet and then inserting the filter means into the individual wells of the micro-titer plate. This method however would have the disadvantage of being difficult to automate because the handling of the individual filter means would be complicated and cumbersome, thus requiring sophisticated and expensive equipment. Moreover, the degree of complexity and risk of failure during production would substantially increase when the amount of wells per area increases.

Accordingly, it is desirable to find a further method for producing micro-titer plates, which method is preferably convenient, cost effective, capable of producing micro-titer plates that have a high number of wells per unit area and which micro-titer plates preferably have a reduced problem of cross-talk and good separation performance.

DISCLOSURE OF THE INVENTION

The micro-titer plate of the present invention can be obtained by providing an array of a plurality of sample containers connected to each other of which each sample container has one or more side walls enclosing the interior of the sample container, a bottom wall with an outlet opening and an opposite upper end that is open and defines an inlet opening. The sample containers will generally be formed from a thermoplastic material and can be produced by injection molding. Typically thermoplastic materials that can be used include polystyrenes, polyvinyl chloride (including homo and copolymers thereof), polyethylenes and polyvinylidene chloride.

A plurality of filter means for insertion into the plurality of sample containers are preformed in a filter sheet. By the term "preformed" or "preforming" is meant that the shape and size of the filter means is substantially formed in the filter sheet but wherein the filter means continue to be held within the filter sheet such that they do not accidentally separate from the filter sheet during its handling. By the terms "filter means" and "filter sheet" in connection with this invention are meant any means or sheet that can cause separation of one or more components from a mixture of components. For example, the terms “filter means” and “filter sheet” include sheets that can separate a solid component from the liquid in a dispersion as well as a membrane or sheet which can separate components which may be dissolved by selectively binding them. The filter means of the present invention for example are means that allow selective adsorption, in particular of nucleic acids and proteins from liquids containing complete plant, animal or human cells or parts thereof. The filter sheet and filter means in connection with the present invention may be single layer sheets or means but they are preferably laminates comprising several layers. For example, according to a particular embodiment, the filter sheet and filter means can be a laminate of a pre-filter layer, a solid phase extraction medium preferably in the form of a membrane and a porous support layer. The filter means of the present invention will typically have a rigidity such that they will not substantially deform and substantially stay in place while being used so as to be capable of performing its separation function in the micro titer test plate.

Preforming the filter means in the filter sheet has the advantage that the filter means can be easily separated from the filter sheet creating a minimum of dust that could interfere with the performance of the filter. According to a first embodiment of preforming the filter means in the filter sheet, the filter means are partially cut out a filter sheet. Such partial cutting may be carried out by any cutting means known to those skilled in the art including, cutting by means of knifes, laser or water jets.

The filter means are cut out in such a way that the filter means stay connected to the filter sheet at one or more points on their periphery. By the term “stay connected at one or more points on the periphery” is meant that the major part of the periphery of the filter means is cut out and only a small portion on the periphery is not cut. At the minimum, the portion of the periphery that is not cut should be sufficient to retain the filter means on the filter sheet during further handling in the manufacturing of the micro-titer plate. Typically, it will suffice to have the filter means connected at 1, 2, 3 or 4 points on their periphery. Such points of connection will typically have a size of 0.1 mm to 2 mm.

According to an alternative embodiment, the filter sheet is a laminate of a prefilter layer and a porous support layer with a solid phase extraction medium there between. The filter means can then be preformed in the filter sheet by ultrasonically welding the prefilter layer and the porous support layer together at the periphery of the filter means. Preferably, the prefilter layer and porous support layer are consolidated together at the complete periphery of the filter means and land areas are thereby formed between adjacent preformed filter means. Accordingly, the preformed filter means will then be comprised of the solid phase extraction medium that is enclosed by the prefilter layer and porous support layer that are welded together. Such preformed filter means can be subsequently separated from the filter sheet when overlaying the array of sample containers by punching the preformed filter means out of the filter sheet without substantial dust formation. However, dust formation during the separation of the filter means from the filter sheet may be further reduced by also partially cutting the preformed filter means at their periphery where the prefilter layer and support layer are welded together. The additional partial cutting can be carried out as described above.

It has further been found that the filter sheet with preformed filter means having the prefilter layer and porous support layer consolidated at their periphery with land areas defined between them, can be used as such as a well-less plate card in separation methods. In particular, it was found that the land areas defined between adjacent preformed filter means effectively prevents lateral liquid transfer between adjacent filter preformed filter means. Thus in another aspect of the present invention independent and separate of the method of producing micro titer plates, the invention also relates to a well-less plate card as described above.

The internal solid phase extraction medium (SPE) can be in a variety of forms, such as fibers, particulate material, a membrane, other porous material having a high surface area, or combinations thereof. Preferably, the SPE medium is in the form of a membrane that includes a fibril matrix and sorptive particles enmeshed therein. The fibril matrix is typically an open-structured entangled mass of microfibers. The sorptive particles typically form the active material. By “active” it is meant that the material is capable of capturing an analyte of interest and holding it either by adsorption or absorption. The fibril matrix itself may also form the active material, although typically it does not. Furthermore, the fibril matrix may also include inactive particles such as glass beads or other materials for enhanced flow rates. According to a preferred embodiment, the solid phase extraction medium comprises silica based particles derivatized with hydrocarbon chains such as for example C18, C8 or C2 hydrocarbon chains, or styrenedivinylbenzene (e.g., SDB-XC available from Transgenomic Inc., San Jose, Calif.) used separately or in combination with one another; polymeric or resin polymers, including copolymers, terpolymers or polymeric blends of two or more resin types; chelating and ion exchange particles; and other particle types such that derivatization chemistry on the particle yields special ligands that may be used for attachment to proteins or other biomolecules at specific sites. The solid phase extraction media may also comprise particle loaded carrier webs, including thermoplastic nonwoven webs (e.g. melt blown microfiber webs, spunbond webs, etc.), woven fabrics, knitted fabrics, and microporous films. Particle loaded glass fiber fabrics may also be used as SPE media.

The prefilter layer is a porous material that can be made of a wide variety of materials. Typically, and preferably, it is made of a nonwoven material. More preferably, it is a nonwoven web of melt blown microfibers. Such “melt blown microfibers” or simply “blown microfibers” or “BMF” are discrete, fine, discontinuous fibers prepared by extruding fluid fiber-forming material through fine orifices in a die, directing the extruded material into a high-velocity gaseous stream to attenuate it, and then solidifying and collecting the mass of fibers. In preferred embodiments, the prefilter layer includes a nonwoven web of melt blown polyolefin fibers, particularly polypropylene fibers.

The prefilter layer preferably has the following characteristics: a solidity of no greater than about 20%; a thickness of at least about 0.5 millimeters (mm); and a basis weight of at least about 70 grams per square meter ($g/m^2$). As used herein, solidity refers to the amount of solid material in a given volume and is calculated by using the relationship between weight and thickness measurements of webs. That is, solidity equals the mass of a web divided by the polymer density divided by the volume of the web and is reported as a percentage of the volume. The thickness refers to the dimension of the prefilter through which the sample of interest flows and is reported in mm. The basis weight refers to mass of the material per unit area and is reported in $g/m^2$.

In accordance with a particular aspect of the present invention, the prefilter can be selected so as to cooperate with the SPE medium to remove the analyte of interest. That is, in certain extraction procedures a prefilter can be chosen such that it helps capture the targeted analyte, thereby increasing the recovery yield. For example in a particular embodiment, the filter medium may be designed to remove hydrocarbon extractables (e.g., nonpolar hydrocarbons such as oil and grease) from a liquid sample (e.g., water). One such filter medium designed to remove hydrocarbon extractables includes a prefilter layer, an SPE medium containing a polytetrafluoroethylene (PTFE such as TEFLON) fibril matrix containing C18 hydrocarbon derivatized silica particles and glass beads, and a support layer. The prefilter of this filter medium is a polyolefin (e.g., polypropylene or polyethylene) blown microfiber web, which acts both as a depth filter and as a medium to help capture the hydrocarbon extractables. This combination of a prefilter with the PTFE fibril matrix and C18 hydrocarbon derivatized silica particles results in high efficiency extractions. Although this prefilter design is not limited to hydrocarbon analysis, a synergistic effect results from the use of the described prefilter in combination with a C18 hydrocarbon derivatized silica particles containing PTFE membrane as the SPE medium. In other applications the action of the prefilter may only reside in its ability to function as a filter for suspended solids, for example, and not as an adjunct to the sorption capabilities of the solid phase extraction medium.

The support layer can be made of a wide variety of porous materials that do not substantially hinder flow of the liquid of the sample of interest. The porous material is typically a material that is capable of protecting the solid phase extraction medium from abrasion and wear during handling and use. The material is sufficiently porous to allow the liquid sample to flow through it, although it does not allow particles that might be within the solid phase extraction medium from contaminating the sample. Preferably, the support layer is made of a nonwoven material. Typically, and preferably, the material of the prefilter and the support layer are very similar in composition (as opposed to structure), and more preferably, they are the same.

In a particular embodiment of the present invention, the filter sheet may comprise an SPE medium or loose silica based particles derivatized with hydrocarbon chains such as for example described above or SDB-XC captured between two layers of porous cover sheets. Preferably the porous cover sheets comprise a thermoplastic material, and may be selected from the group consisting of nonwoven webs (e.g. melt blown microfiber webs, spunbond webs, etc.), woven fabrics, and knitted fabrics. Additionally, filter paper having a discontinuous thermoplastic coating, open cell thermoplastic foams, or apertured thermoplastic films can also be used as cover sheet materials.

Preforming of the filter means through ultrasonically consolidating the prefilter layer and porous layer may be carried out in one single step whereby all of the plurality of filter means are preformed at once. However, if a large number of filter means need to be preformed, the ultrasonic consolidation is preferably carried out in several steps whereby in each step only a number of the total desired number of filter means are preformed. In the latter case, it is desirable that a registration step is included to make sure that the filter means are preformed in the desired arrangement.

The plurality of preformed filter means when used to produce a microtiter plate conform in arrangement, number and shape to the arrangement, number and shape of the sample containers of the array. Furthermore, the size of the filter means will typically be such that when the filter means are placed into the sample containers and are supported by the bottom wall of the sample containers, the periphery of the filter means will also abut the side walls of the sample container. Accordingly, the filter means will typically correspond to the size of the sample container near the bottom wall where the filter means are placed or they can be slightly larger. Accordingly, a filter sheet is obtained with preformed filter means that correspond in number, arrangement and shape to the sample containers of the array. This filter sheet is registered with the inlet openings of the sample containers such that the filter means can then be separated from the filter sheet and inserted into the sample containers. Separation of the filter means can be caused by pressing the filter means into the sample container thereby tearing off the filter means or alternatively, the filter means may be separated by cutting at the periphery. The remainder of the filter sheet is removed. In accordance with the method of this invention, the filter means are placed such that they are supported by the bottom wall and are in abutment with the side walls of the sample container along their periphery. It should be understood that while the method of the present invention has been described with a certain order of the steps to be taken, it is clear that the steps of the present method of the invention may also be carried out in another order.

In accordance with a preferred embodiment of the present invention, the sample containers contain a band enclosing an opening. This band abuts along its periphery, the inner surface of the side wall(s) of the sample containers and presses or holds the filter means against the bottom wall of the sample container. The bands generally conform to the shape of the sample container and are preferably rings when the sample containers are tubular. The bands are preferably plastic or rubbery.

If bands are provided in the sample containers, they can be placed therein individually or they can be placed into the sample containers in a similar fashion as the placement of the filter means. Thus, a plurality of interconnected bands may be provided, for example connected via a thin film sheet. These interconnected bands can then be placed on the upper end of the sample containers in register with the inlet openings of the sample containers and they can then be separated from each other and pressed into the sample containers to abut the filter means.

Micro-titer plates produced in accordance with the present invention generally are less prone to cross-talk, are fairly convenient to produce, and have a good separation performance. With the micro-titer plates of the present invention, it is possible to perform a physical separation, a chemical separation, or a bio-polymer separation or extraction of liquids containing plant, animal or human cells, and it allows, in particular, to perform the separation of nucleic acids and/or proteins of the cells. To this effect, the liquid in the sample container penetrates a filter means having selective adsorbing material, the liquid leaving the filter means and entering a collecting container. Preferably, the filter means having selectively adsorbing material has chromatographic properties, which can include ion exchange properties or affinity-chromatographic properties, if the filter means comprises suitable affinity ligands. A preferred filter means comprises a fibrillated polytetrafluoroethylene matrix having enmeshed therein sorptive derivatized silica particulates as are disclosed in U.S. Ser. Pat. Nos. 4,810,381 and 4,699,717, respectively. Subsequently, the collecting container is replaced by another one, and a liquid containing a solvent is applied onto the filter means, which selectively removes a certain portion of the material adsorbed in the filter means so that it may enter the collecting container.

The filter means of the device of the present invention may comprise one or several layers. Preferred filter means comprise a fibrillated polytetrafluoroethylene matrix having sorptive particulates enmeshed therein, as is disclosed, for example, in U.S. Pat. No. 4,810,381. In one embodiment, the filter means may be formed by two porous fixation means, in particular frits, with particles therebetween. Preferably, the particles can be in the form of bulk material, have chromatographic properties as described before. The preferred particles are made from a material that is based on silica gel, dextran or agarose. Frits may consist of glass, polyethylene (PE) or polytetrafluoroethylene (PTFE) and have a pore size of about 0.1-250 μm, preferably about 100 μm.

The thickness of the particle layer is about 1-10 mm, preferably 2.5 mm, with an average particle size of 1-300 μm, preferably 16-23 μm.

According to a further embodiment, the filter means has a support membrane in which the adsorptive particles are embedded. Since the support membrane can be rather weak and there being a possibility that it can burst when a partial vacuum is applied on it (of comparatively high pressure difference), a back-up fabric or fibrous layer can be arranged below the support membrane, which provides integrity to the support membrane on the bottom wall of the sample container and preferably consists of a non-woven polyalkylene fibrous material such as polypropylene or polyethylene.

The micro-titer plate of the present invention is not limited to the dimensions of the single parts mentioned herein. Generally, the micro-titer plate of the invention can be produced in any desired size. Nevertheless, the method of the present invention is particularly suitable for producing micro-titer plates that have a large number of sample containers per unit of area.

Accordingly, the present invention in another aspect also provides a micro-titer plate comprising an array of between 360 and 400 sample containers connected to each other each having one or more side walls enclosing the interior of said sample container, a bottom wall with an outlet opening and an opposite upper end that is open and defines an inlet opening and each of said sample containers having an individual filter means that is in abutment with the side walls along its periphery and that is further in abutment with said bottom wall and wherein said micro-titer test plate has a length between 11 and 13 cm and a width between 8 and 9 cm.

Typically, the micro-titer plates produced in connection with this invention will have a plurality of sample containers connected to each other each generally of a tubular form although other forms such as sample containers that have at least a section with a rectangular or square cross-section can be used as well. The side walls enclosing the interior of the sample containers may taper towards the outlet opening although preferably the sample containers are tubular without substantially tapering towards the outlet opening. The outlet openings of the sample containers of the micro-titer plates that can be produced in connection with this invention preferably are enclosed by an outlet spout that extends in the axial direction of the sample container. This spout is preferably tapered towards its free end and may be surrounded by a collar.

In another aspect, the present invention provides a well-less filtration device that includes a pre-filter layer; a support layer; and at least one layer of solid phase extraction medium disposed between the pre-filter layer and the support layer. At least a portion of the pre-filter layer, support layer and solid phase extraction medium are ultrasonically welded together to form a pattern of filter cells and land areas with the land areas being disposed between the filter cells. The filter cells of the device may be arranged to conform to a standardized array format.

BRIEF DESCRIPTION OF THE DRAWINGS

The invention is further illustrated by means of reference to the following drawings that represent preferred embodiments of the invention without however the intention to limit the invention thereto.

DETAILED DESCRIPTION OF THE PREFERRED EMBODIMENTS

Figure 2:
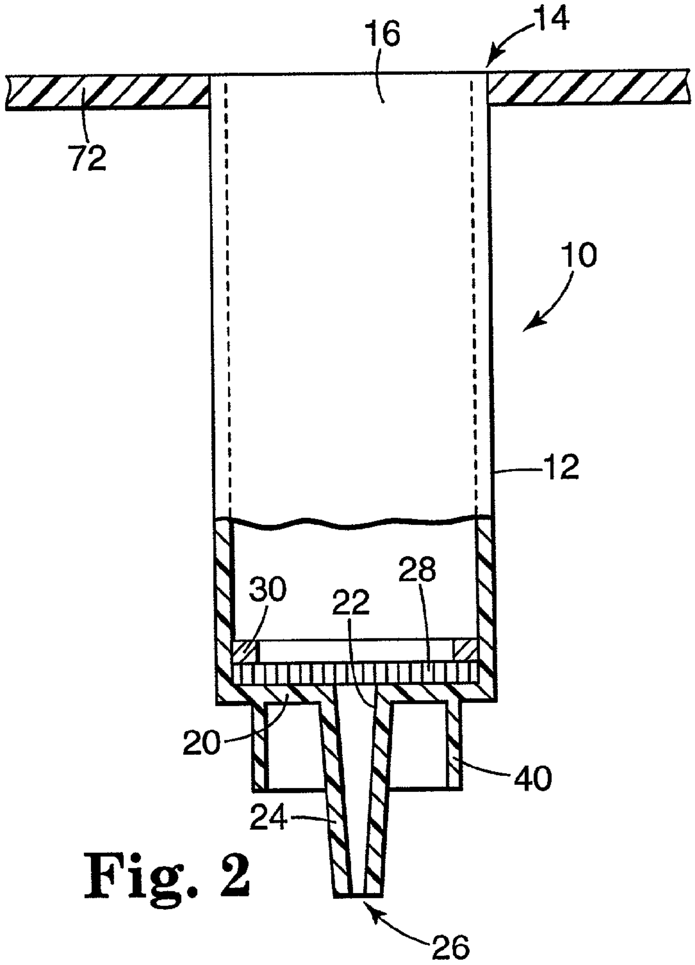
FIG. 2 shows a cross-sectional view of an individual sample container of a micro-titer plate according to the invention.
Figure 3:
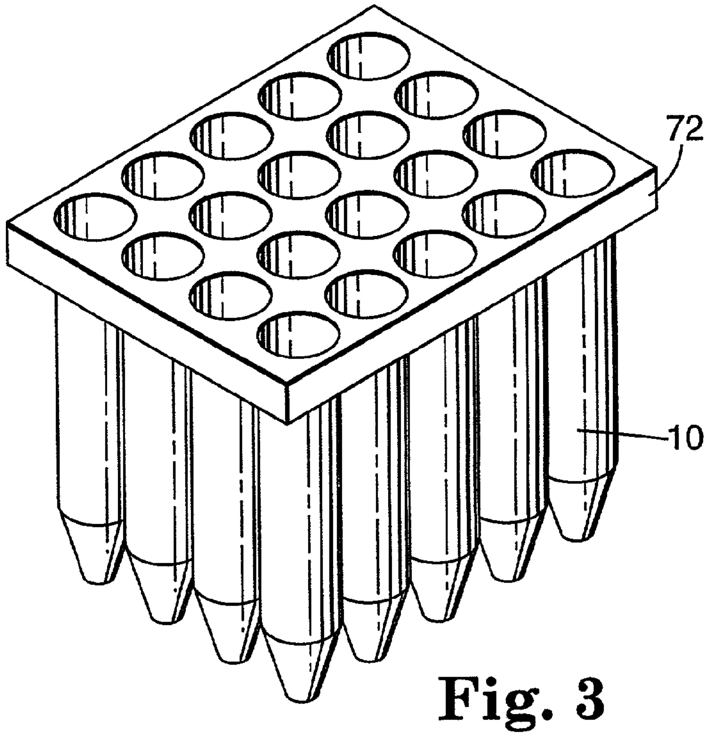
FIG. 3 shows three dimensional representation of a micro-titer plate in connection with the invention.

Referring now to FIG. 3, there is shown a three dimensional representation of an array of a plurality of sample containers 10 connected to each other. As shown in FIG. 3, the sample containers 10 are connected to each other by a plate 72. FIG. 2 shows a cross-sectional view of an individual sample container 10, preferably tubular, of a micro-titer plate produced in connection with the method of the present invention, i.e. with filter means 28 already inserted therein. As can be seen from FIG. 2, each of the plurality of sample containers has a side wall 12 enclosing the interior of the sample container 10. Sample container 10 further has an upper end 14 which is open and defines an inlet opening 16. Opposite to the upper end is bottom wall 20 for supporting filter means 28. Bottom wall 20 has an opening 22 that defines the outlet opening of sample container 10. The outlet opening 22 is enclosed by a spout 24 which extends in the axial direction of the sample container 10. Spout 24 preferably tapers towards its free end 26 and can have a length of up to 2 cm, preferably 0.1 to 1 cm, more preferably, 0.2 to 1 cm. The diameter of the spout which optionally decreases towards the free end of spout 24 is typically 0.2 to 2.0 mm. The lower surface of bottom wall 20 of sample container 10 also has an axially projecting annular collar 40 formed thereon and which coaxially encloses the outlet spout 24. Collar 40 is shorter than outlet spout 24 which projects downwards beyond the end of collar 40 for about half the length thereof.

FIG. 2 further shows the filter means 28 within the sample container 10. Filter means 28 is disposed on bottom wall 20, covers outlet opening 22 and is in abutment along its periphery with the inner surface of side wall 12. A rubbery, preferably plastic retaining ring 30 pressing against the inner surface of side wall 12 keeps filter means 28 set against the bottom wall 20.

Figure 1A:
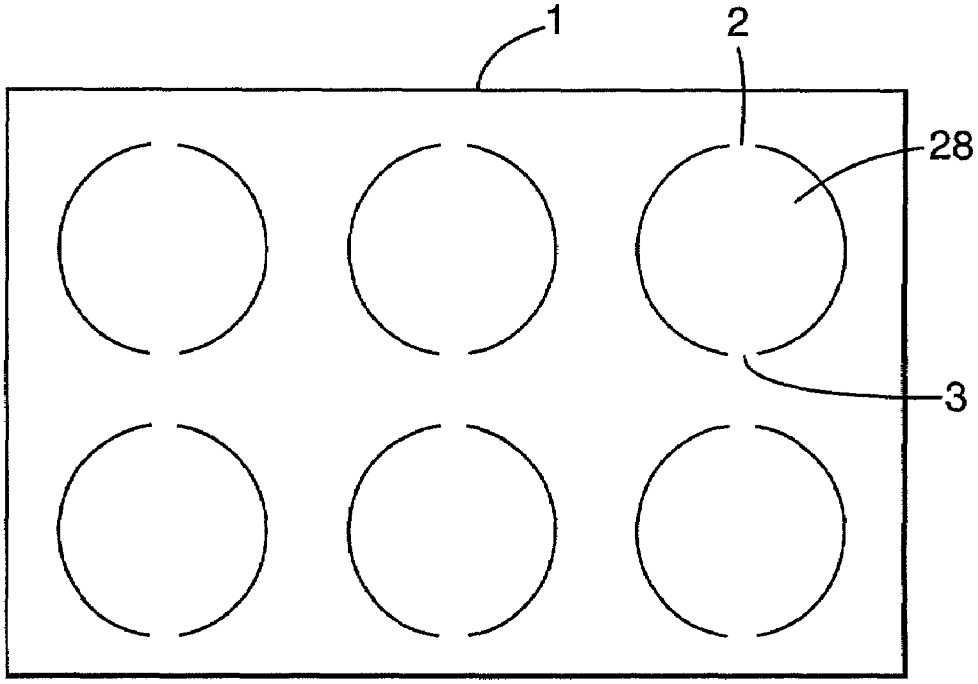
FIGS. 1*a* and 1*b* show a schematic drawing of a filter sheet showing a plurality of filter means partially cut out.
Figure 1B:
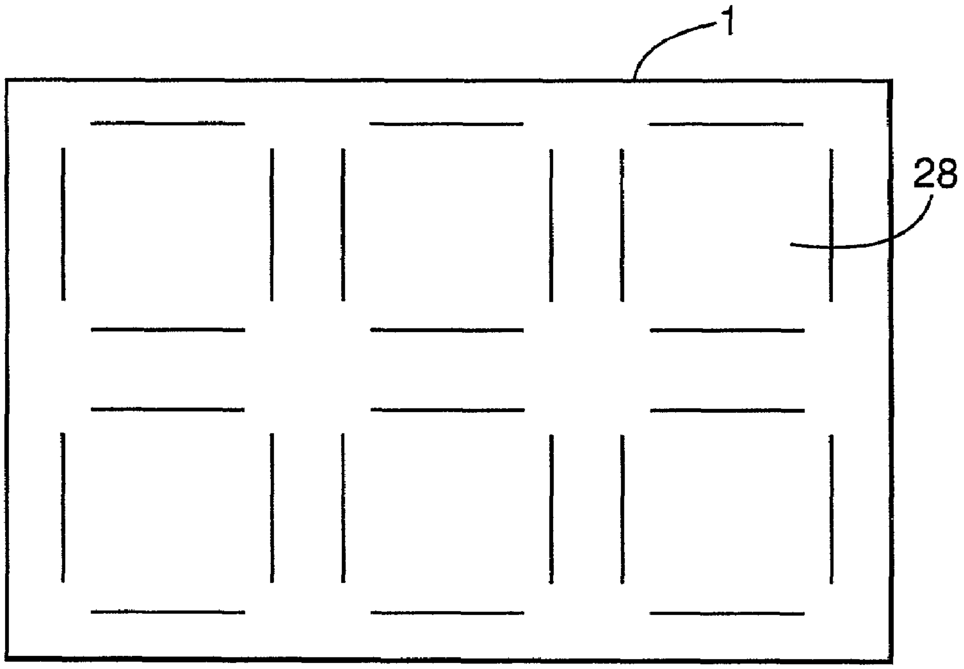

With reference to FIGS. 1*a*, 1*b* and FIGS. 4*a-d*, the method of the present invention for inserting filter means 28 in each of the sample containers 10 will now be illustrated. In accordance with the method of the present invention, there is provided a filter sheet 1. As shown in FIGS. 1*a* and 1*b* filter means 28 are partially cut out in the filter sheet 1. A plurality of filter means 28 are partially cut out from a single filter sheet, which conform in arrangement, shape and number to the plurality of sample containers of the array in which the filter means will be inserted. FIGS. 1*a* and 1*b* show a few of such filter means 28 partially cut out in the filter sheet 1. Filter means 28 of FIG. 1*a* have a circular periphery to conform to a tubular sample container. As can be seen, filter means 28 in FIG. 1*a* have been cut along there periphery except for two oppositely laying points 2, 3 where the filter means 28 remain connected to the filter sheet 1. Filter means 28 of FIG. 1*b* have a square periphery to conform to a sample container that has a square cross-section in a plane parallel to the bottom wall of the sample container. The filter means 28 in FIG. 1*b* have been cut along the periphery leaving only the four comers at the periphery uncut.

As described above, the filter means may also be preformed using ultrasonic consolidation of a prefilter layer and a porous support layer at the periphery of the filter means. FIG. 8 illustrates an embodiment of an ultrasonically preformed filter means.

Figure 8A:
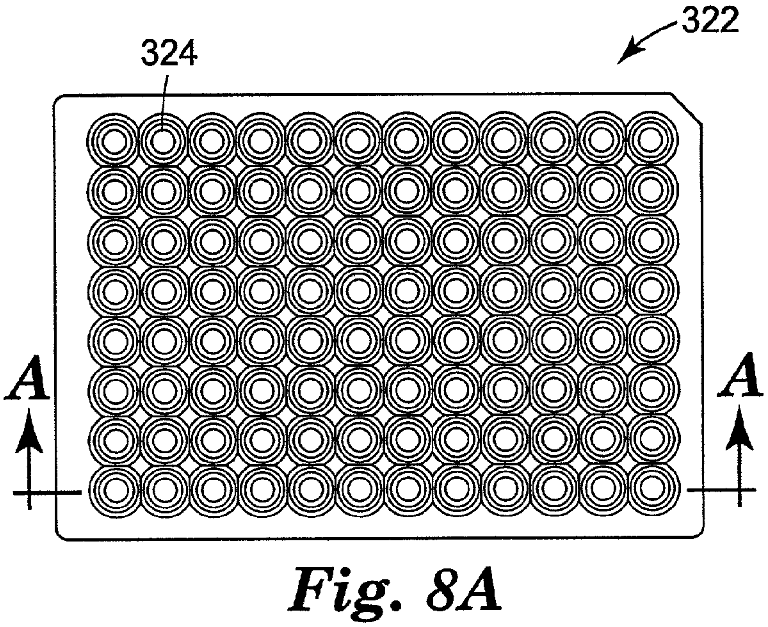
FIGS. 8*a-d* schematically illustrate a filter sheet having filter means preformed therein via ultrasonic welding.
Figure 8B:
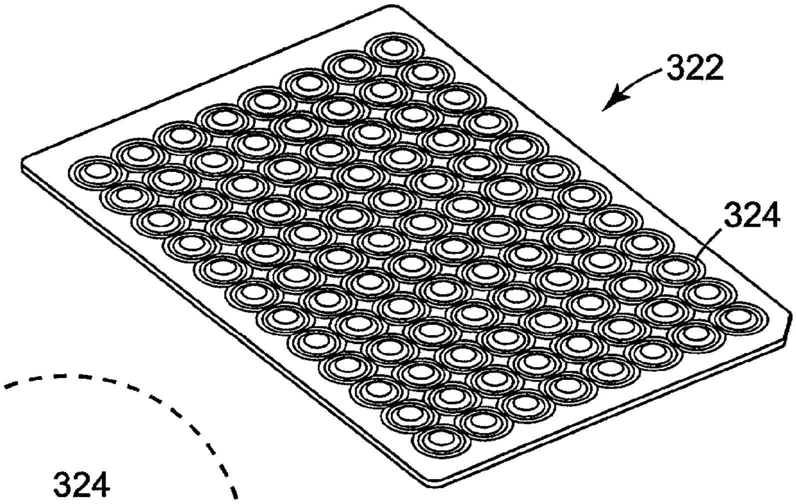
Figure 8D:
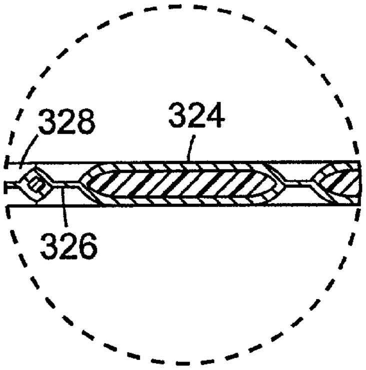
Figure 8C:
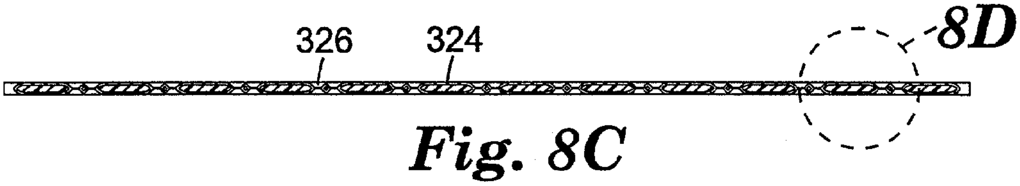

According to the embodiment illustrated, the edges of strip of the filter sheet can be consolidated into a solid film and subsequently notched to allow interaction with a sprocket drive mechanism that precisely advances the filter sheet through the ultrasonic consolidation apparatus, thereby affording precise positioning of the anvil and horn of the ultrasonic welding device. FIG. 8A is a schematic top view and FIG. 8B is a schematic perspective representation of a filter sheet 322 after the indexing sprockets have been removed. FIG. 8C is a schematic representation of cross-section AA of FIG. 8A showing preformed filter means 324 and compressed land areas 326. FIG. 8D is a schematic representation of an expanded area of FIG. 8C that more clearly shows preformed filter means 324, land areas 326 and smaller uncompressed areas 328 of filter sheet 322 between adjacent preformed filter means.

In the ultrasonic welding method to preform the filter means, the shape, size, and spacing of filter cells can be varied over a broad range simply by changing the embossing pattern on the horn and anvil of the ultrasonic consolidation apparatus.

The following example illustrates a detailed method of preforming the filter means by using the ultrasonic welding technique. A polytetrafluoroethylene (PTFE) having enmeshed therein C18 hydrocarbon derivatised silica particles (mean volume particle size=55 microns, supplied by Varian or United Chemical Technologies) and glass beads was prepared according to the procedure described in U.S. Pat. No. 4,656,663 (Errede et al.). The SPE sheet composition consisted of 6 wt. % C18 hydrocarbon coated beads relative to the weight of the 70 micron glass beads (supplied by 3M Company, St. Paul, Minn. under the trade designation TUNGO) and 2.0 wt. % PTFE (supplied by ICI Americas, Inc. under the trade designation FLURON) relative to the weight of the 70 micron glass beads. The dough was passed through a two-roll mill eight times to produce a SPE membrane 0.064 cm thick and having a durometer of 35.

The thus formed SPE sheet was placed between two layers of spun bond polypropylene CELESTRA fabric (commercially available from BBA Nonwovens, Simpsonville, S.C.) and the three layer laminate formed into a unitized structure (117 mm×77 mm)using a pinch welding operation in a Branson 901 ae ultrasonic plunge welding machine, (900 watts power, available from Branson Ultrasonics, Danbury, Conn.) equipped with a standard cut-and-seal ultrasonic welding anvil. The anvil had a cutting angle of 25 degrees, the weld time was 1.0 second, and the hold time was 0.17 seconds.

Ninety-six filter cells, 4 mm in diameter were formed in the filter sheet in a 8×12 array, with a land area approximately 1.5 mm wide separating the adjacent filter cells. Land formation was accomplished using a Branson 901 ae ultrasonic plunge welding machine equipped with an anvil and horn having a matching 48-cell array. The anvil was formed from heat-treated D2 tool steel and had 4 mm diameter circular depressions and 1.5 mm wide welding flats that produced the desired filter cell/land pattern. Filter cells were formed in a two-step operation, with 48 cells being formed in each step. Approximately 1700 watts of power were required for each plunge welding operation with a weld time of 1.0 second, and a hold time was 0.17 second. Filter cell registration for the formation of the second set of 48 filter cells was maintained through frame/anvil fixturing.

The effectiveness of the land areas' ability to prevent lateral liquid transfer between adjacent preformed filter means was demonstrated by using the above described platecard to isolate a dye from an aqueous solution. A Nile Blue dye (available from Aldrich Chemical, Milwaukee, Wis.) was placed on the filter means and removed and examined for evidence of lateral transfer of the dye. The dye was totally retained within all 96-filter cell areas with no indication of lateral transfer.

Figure 4A:
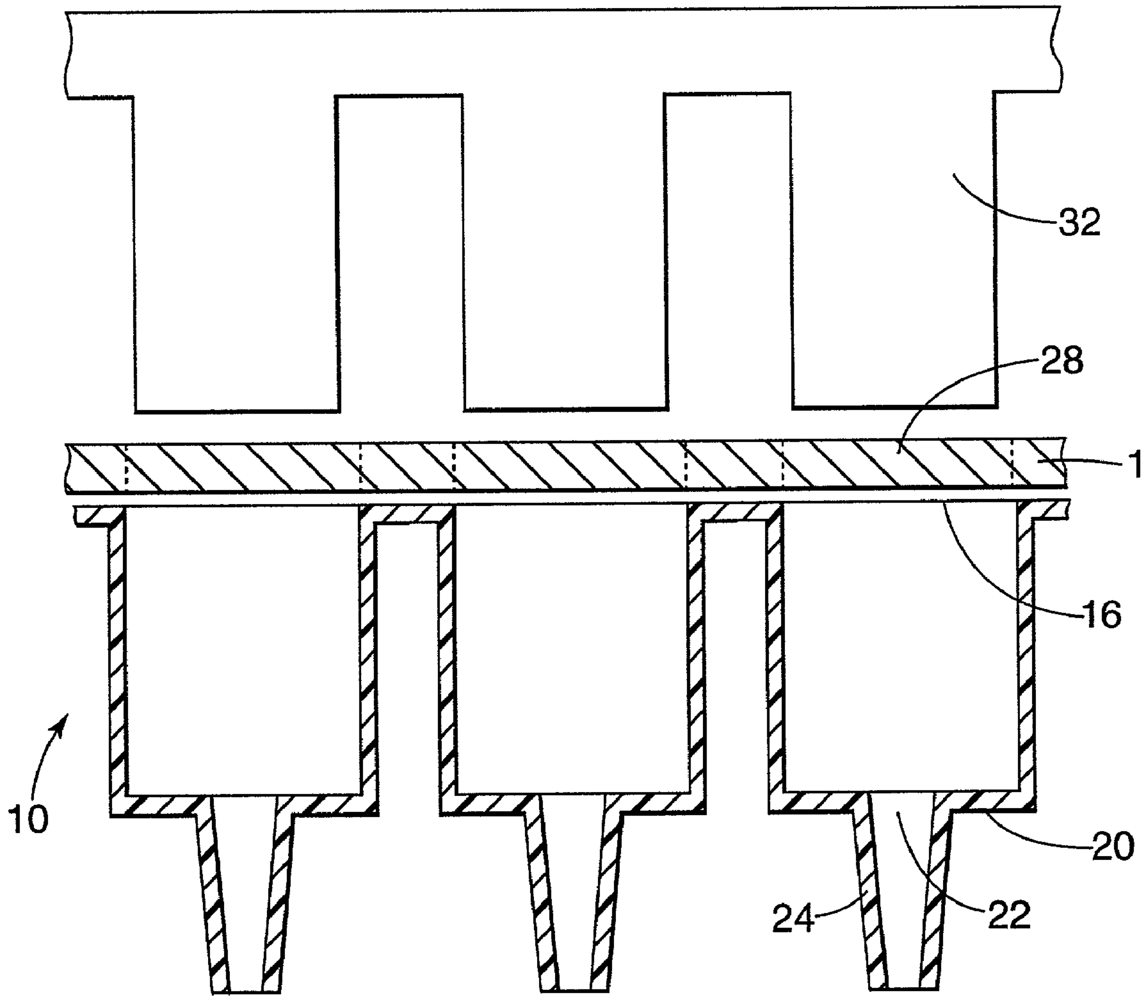
FIGS. 4*a-d* schematically shows the insertion of the filter means into the sample containers by tearing them of the filter sheet.
Figure 4B:
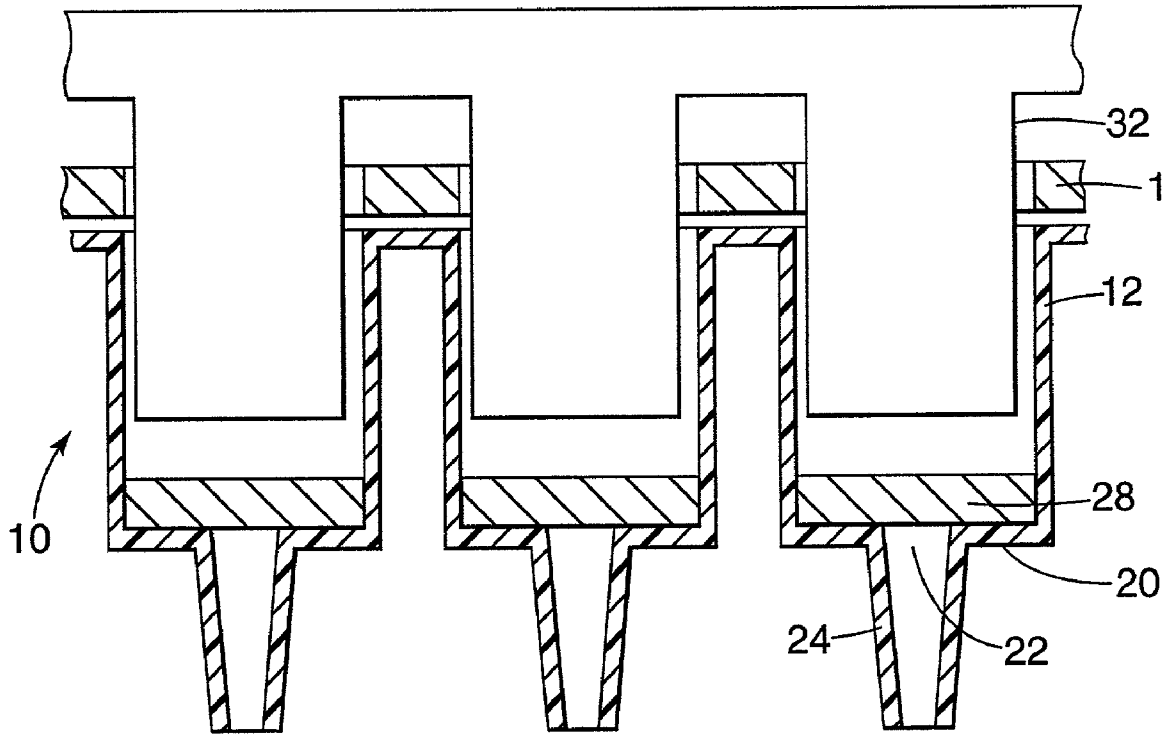
Figure 4C:
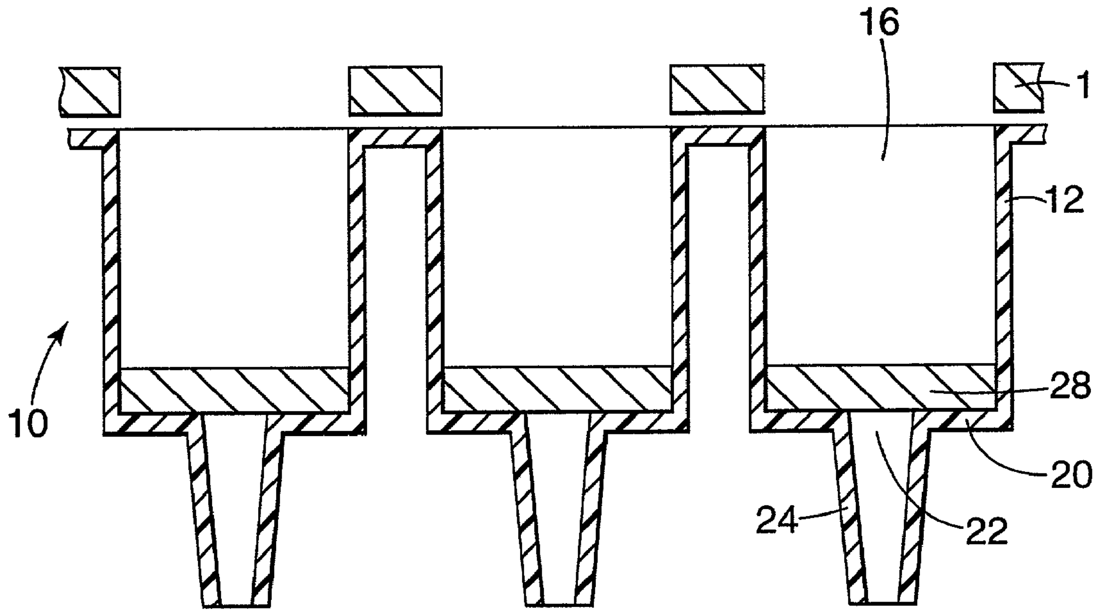
Figure 4D:
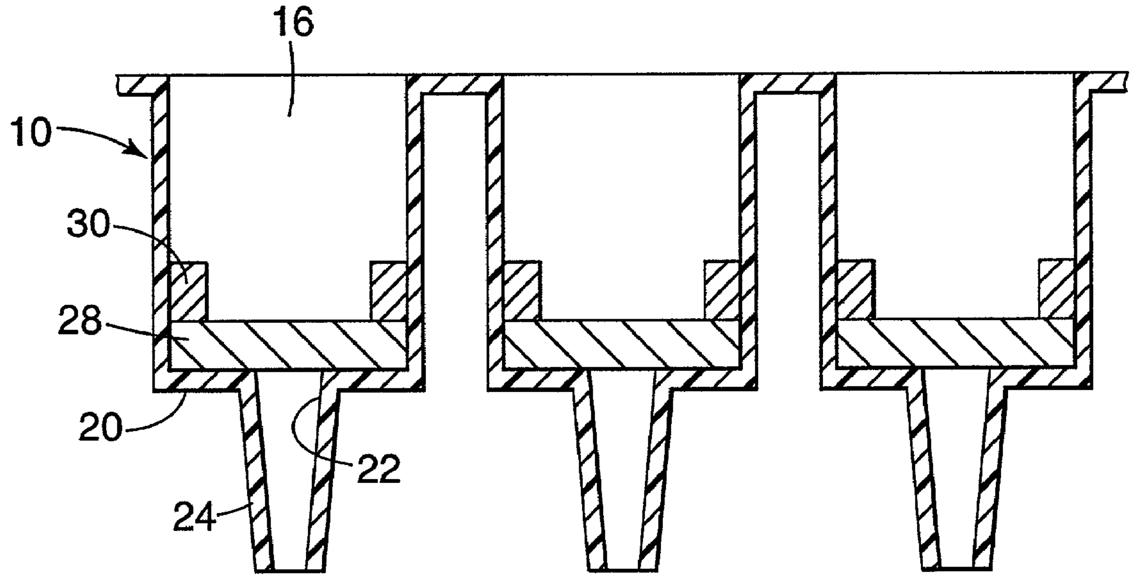
Figure 5:
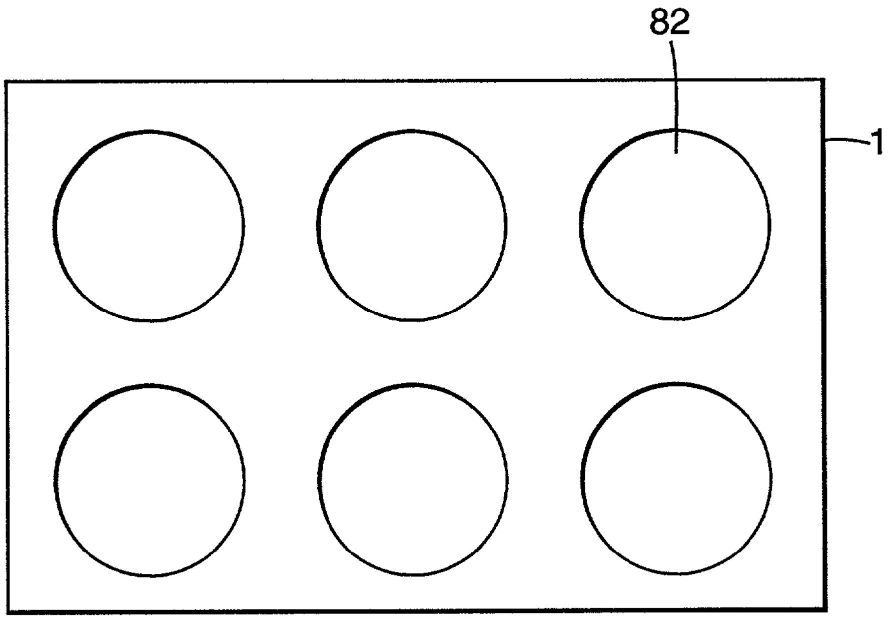
FIG. 5 shows the remainder of the filter sheet after the filter means have been separated therefrom.

FIGS. 4*a* to 4*d* show a cross-sectional view of the plurality of sample containers 10 connected to each other. As shown in FIG. 4*a*, the filter sheet 1 with a plurality of filter means 28 partially cut out is placed on inlet openings 16 at the upper end of the plurality of sample containers such that the filter means 28 are in register with the inlet openings 16. To place the filter means 28 into register with the inlet openings 16, registering aids well known to those skilled in the art may be employed if desired. For example, the array of sample containers may be provided with register pins (not shown) and the filter sheet 1 can be provided with corresponding register holes (not shown). Further shown in FIG. 4*a* is a plurality of pistons 32 that are dimensioned such that they can penetrate the interior of the sample containers 10 up to the bottom of the sample containers 10. As shown in FIG. 4*b*, by moving the plurality of pistons 32 downwards or alternatively by moving the sample containers 10 with the filter sheet thereon over the pistons, the filter means 28 are torn off at the points were they were still connected at the filter sheet 1 and are pressed by the pistons against the bottom wall 20 of the sample container 10. To avoid that the filter means 28 would be incorrectly positioned at the bottom wall, it may be desirable to apply a vacuum to the pistons to keep the filter means in position while pressing them downwards into the sample containers 10. However, if movement of the pistons into the sample containers 10 is fast enough, the risk of an incorrect positioning of the filter means will be low and it may not be necessary to apply a vacuum to the pistons in that case. Instead of tearing off the filter means 28, they may be cut at the points where they are still connected to the filter sheet 1. For example, the points may be cut by a laser or alternatively, the edges of the pistons may be provided as sharp edges to cut the points while pressing the filter means 28 into the sample containers 10. When the points are cut to separate the filter means 28 from the filter sheet, cutting of the points is then generally carried out while the filter means 28 are in register with the openings 16 and thereafter the filter means 28 can be pressed by the pistons 32 against the bottom wall 20. FIG. 4*c* shows the result after the pistons are again withdrawn. As can be seen from this figure, the filter means 28 are now supported by the bottom wall of the sample containers 10 and abut the inner surface of the side wall 12 of the containers 10. The remainder of filter sheet 1 from which the filter means 28 were separated is left on the upper end of the sample containers 10. This remainder of the filter sheet 1 is then removed. FIG. 5 shows a planar view of filter sheet 1 showing the circular openings 82 created by separation of the filter means 28 from filter sheet 1.

According to a preferred embodiment in connection with the present invention, the filter means 28 are pressed against the bottom wall by a band 30 defining an opening and abutting the inner surface of side wall 12. Preferably band 30 is a ring. These rings may be individually inserted by pistons but are preferably inserted in a similar way in which the filter means 28 are inserted in the sample containers 10. This is illustrated in FIGS. 6 and 7.

Figure 6:
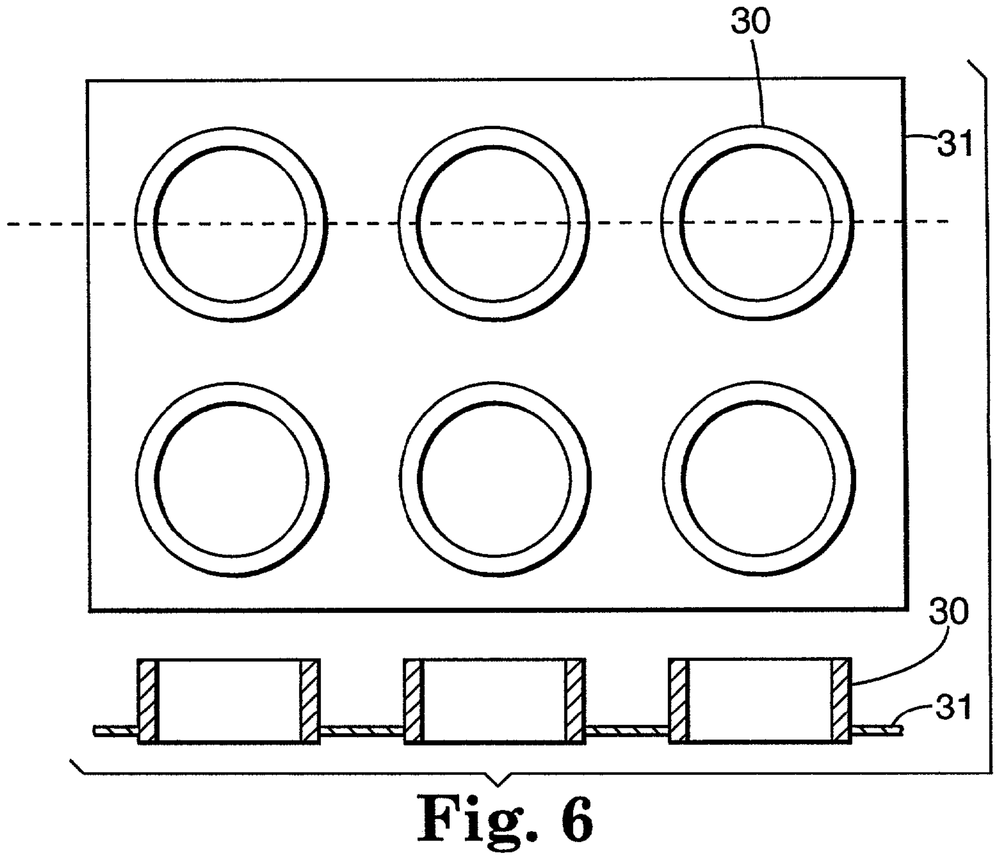
FIG. 6 shows a plurality of rings that are connected of each other by a film.
Figure 7:
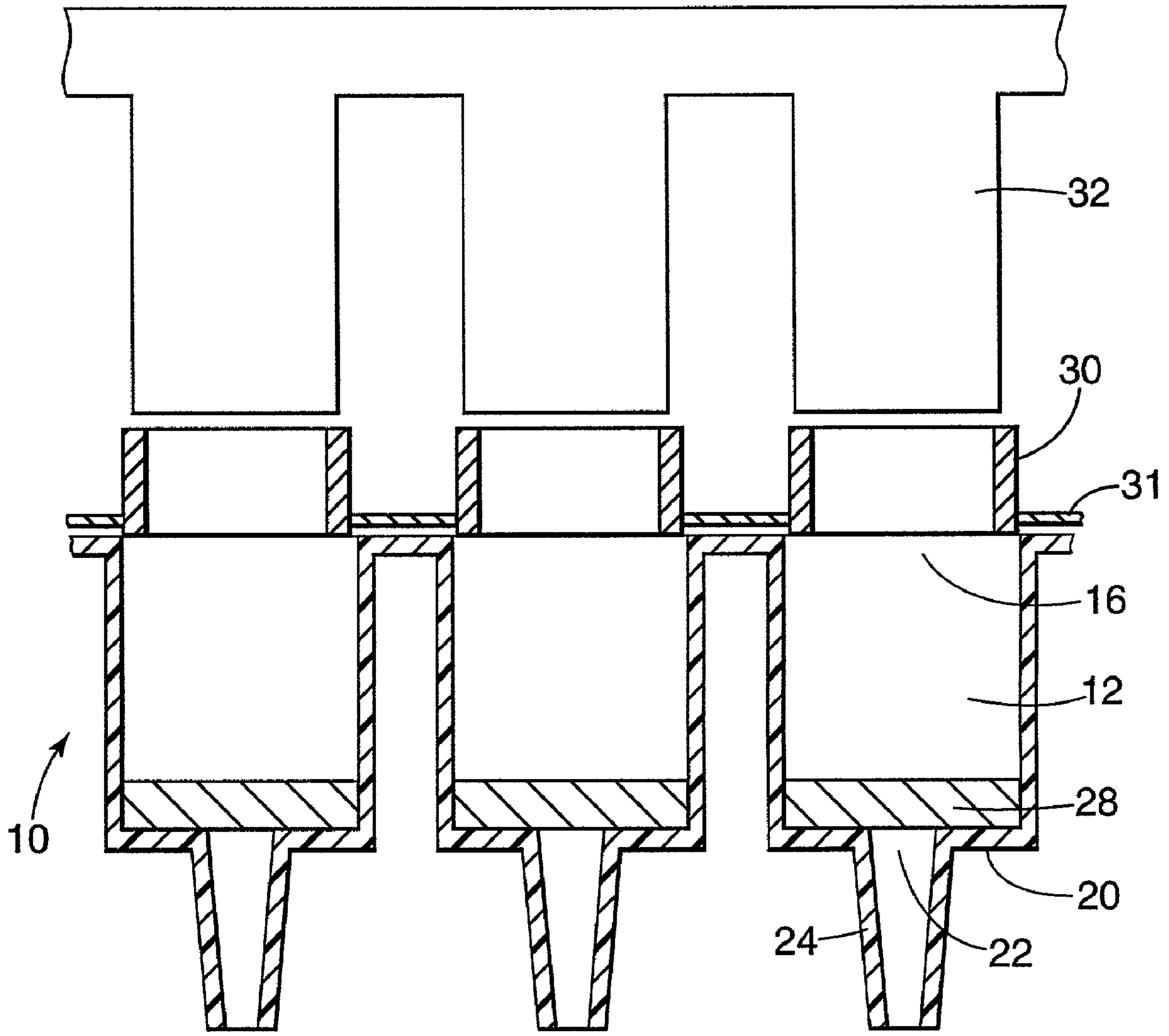
FIG. 7 shows the placement of the rings shown in FIG. 6 into the sample containers of a micro-titer plate according to the invention.

FIG. 6 shows a planar view as well as a cross-section along the indicated line of a plurality of rings 30 that are connected to each other by thin film 31. The film 31 may be thinned at the circumference of the rings 30 to make separation of the rings 30 from the film 31 easier. Alternatively, rings 30 may be connected to each other via thin rods. As shown in FIG. 7, the film 31 with rings 30 is placed on the upper end of the sample containers 10 such that they are in register with openings 16 of the sample containers 10. Pistons 32 may then press the rings into the sample containers 10 while simultaneously separating the rings 30 from the film 31. Pistons 32 will push the rings 30 against the filter means 28 to cause a press-tight connection therewith. To further ease the separation of the rings 30 from the film 31, the pistons may be provided with sharp edges to cut the rings along their circumference. Also, the rings 30 may be partially cut along their circumference in a similar way as the filter means 28 are partially cut from the filter sheet 1.

The invention claimed is:

1. A well-less filtration device comprising:

a pre-filter layer;

a support layer; and at least one layer of solid phase extraction medium disposed between the pre-filter layer and the support layer;

wherein at least a portion of the pre-filter layer and the support layer are ultrasonically welded together to form a pattern of:

filter cells that enclose the solid phase extraction medium and having the prefilter layer and porous support layer consolidated at the periphery of each filter cell, thereby forming compressed land areas disposed between and isolating adjacent filter cells.

2. The device of claim 1 wherein the solid phase extraction medium comprises fibers, particulate material, a membrane, or a combination thereof.

3. The device of claim 2 wherein the solid phase extraction medium comprises sorptive particle enmeshed within a fibril matrix.

4. The device of claim 3 wherein the sorptive particles comprise silica-based particles, resin polymers, chelating particles, or ion exchange particles.

5. The device of claim 4 wherein the particles comprise polypyrrole.

6. The device of claim 3 wherein the sorptive particles are derivatized with hydrocarbon chains, styrenedivinylbenzene, at least one ligand, or a combination thereof.

7. The device of claim 6 wherein the ligand specifically binds a known biological molecule.

8. The device of claim 7 wherein the ligand comprises an antibody.

9. The device of claim 6 wherein the sorptive particles are derivatized to include azlactone groups.

10. The device of claim 1 wherein the solid phase extraction medium comprises a melt blown microfiber web, a spunbound web, a woven fabric, a knitted fabric, a microporous film, or a glass fiber fabric.

11. The device of claim 1 wherein the pre-filter layer comprises a porous material.

12. The device of claim 11 wherein the porous material comprises a nonwoven web.

13. The device of claim 12 wherein the nonwoven comprises melt blown polypropylene fibers.

14. The device of claim 1 wherein the support layer comprises a porous material.

15. The device of claim 1 wherein the pattern of filter cells and land areas comprises at least 48 filter cells.

16. The device of claim 15 wherein the pattern of filter cells and land areas comprises at least 96 filter cells.

17. The device of claim 16 wherein the pattern of filter cells and land areas comprises at least 384 filter cells.

* * * * *

UNITED STATES PATENT AND TRADEMARK OFFICE

CERTIFICATE OF CORRECTION

PATENT NO. : 7,311,880 B2
APPLICATION NO. : 10/167370
DATED : December 25, 2007
INVENTOR(S) : Craig A. Perman It is certified that error appears in the above-identified patent and that said Letters Patent is hereby corrected as shown below:

Column 9
Line 24, delete “comers” and insert
-- corners --, therefor.

Column 12
Line 39, in Claim 13, after “nonwoven”
insert -- web --.

Signed and Sealed this

Sixth Day of January, 2009

JON W. DUDAS
*Director of the United States Patent and Trademark Office*